United States Patent
Speirs et al.

(10) Patent No.: US 8,285,037 B2
(45) Date of Patent: Oct. 9, 2012

(54) COMPRESSION FORMAT AND APPARATUS USING THE NEW COMPRESSION FORMAT FOR TEMPORARILY STORING IMAGE DATA IN A FRAME MEMORY

(75) Inventors: Christopher R. Speirs, Zurich (CH); Matheus J. G. Lammers, Nederweert (NL)

(73) Assignee: NXP B.V., Eindhoven (NL)

( * ) Notice: Subject to any disclaimer, the term of this patent is extended or adjusted under 35 U.S.C. 154(b) by 1048 days.

(21) Appl. No.: 11/817,324

(22) PCT Filed: Feb. 22, 2006

(86) PCT No.: PCT/IB2006/050569
§ 371 (c)(1),
(2), (4) Date: Sep. 26, 2008

(87) PCT Pub. No.: WO2006/090334
PCT Pub. Date: Aug. 31, 2006

(65) Prior Publication Data
US 2009/0052772 A1    Feb. 26, 2009

(30) Foreign Application Priority Data
Feb. 28, 2005   (EP) .................................. 05101512

(51) Int. Cl.
*G06K 9/36* (2006.01)
(52) U.S. Cl. ........................................................ 382/166
(58) Field of Classification Search .................. 382/166, 382/232–253, 100; 345/589, 204, 690, 530, 345/555, 545–549; 375/240.01–240.16; 358/1.9, 1.2, 539, 1.15, 426.01–426.16
See application file for complete search history.

(56) References Cited

U.S. PATENT DOCUMENTS

| 5,361,147 A | 11/1994 | Katayama et al. |
| 5,377,018 A * | 12/1994 | Rafferty ................... 358/426.02 |
| 5,453,787 A | 9/1995 | Hancock et al. |
| 5,604,514 A | 2/1997 | Hancock |

(Continued)

FOREIGN PATENT DOCUMENTS

WO    WO02102050 A2    12/2002

(Continued)

*Primary Examiner* — Ishrat I Sherali

(57) ABSTRACT

Display driver (40) with a frame memory (43) for temporarily storing image data representing a color image and a data bus for feeding RGB-formatted image data to said display driver (40). The display driver (2) comprises means for performing an encoding decision process (42) that is based on an analysis of the nature of a pixel cluster of said image data. The means for performing a decision process (42) allow the display driver (43) to decide whether a first compression format or a second compression format is to be applied for compression of said pixel cluster. The first compression means (33.1) perform a compression of said pixel cluster into said first compression format (quantized RGB), and the second compression means (33.2) perform a compression of said pixel cluster into said second compression format (color compressed). The pixel clusters and related compression format code are stored after compression in an available storage area of the frame memory (24) such that parts of said image data can be stored in said storage area in the first compression format and another part of said image data can be stored in said storage area in the second compression format. Said compression format code is used to perform a decision process allowing the display driver (20) to decide whether a first decompression format or a second decompression format is to be applied for decompression of said pixel cluster.

28 Claims, 11 Drawing Sheets

U.S. PATENT DOCUMENTS

| | | |
|---|---|---|
| 5,818,970 A | 10/1998 | Ishikawa et al. |
| 5,872,556 A | 2/1999 | Rackley et al. |
| 5,930,386 A | 7/1999 | Saito |
| 5,953,691 A | 9/1999 | Mills |
| 6,195,391 B1 | 2/2001 | Hancock et al. |
| 6,285,458 B1 * | 9/2001 | Yada ............... 358/1.15 |
| 6,744,919 B2 * | 6/2004 | Said ............... 382/166 |
| 7,724,265 B2 * | 5/2010 | Takada et al. ............... 345/589 |
| 8,208,554 B2 * | 6/2012 | Fernandes ............... 375/240.19 |
| 2001/0005218 A1 | 6/2001 | Gloudemans et al. |
| 2003/0198381 A1 | 10/2003 | Tanaka et al. |
| 2004/0017398 A1 | 1/2004 | MacInnis et al. |
| 2006/0153291 A1 * | 7/2006 | Christison ............... 375/240.01 |
| 2009/0073178 A1 * | 3/2009 | Lammers ............... 345/549 |
| 2009/0322713 A1 * | 12/2009 | Furihata et al. ............... 345/204 |

FOREIGN PATENT DOCUMENTS

| | | |
|---|---|---|
| WO | WO02102050 A3 | 12/2002 |

* cited by examiner

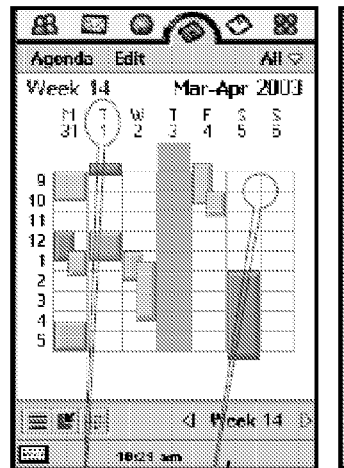
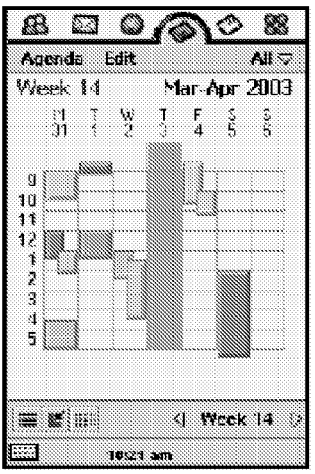
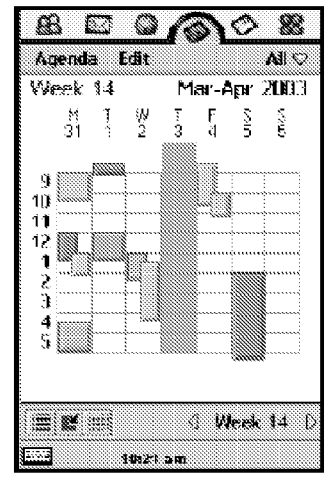
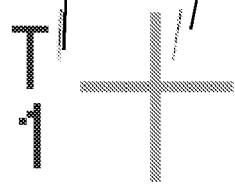
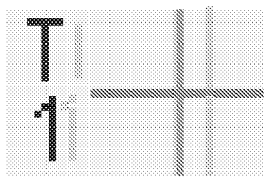
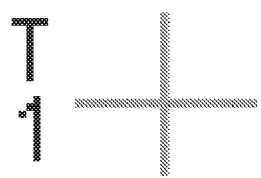
FIG. 9A    FIG. 9B    FIG. 9C
FIG. 10

COMPRESSION FORMAT AND APPARATUS USING THE NEW COMPRESSION FORMAT FOR TEMPORARILY STORING IMAGE DATA IN A FRAME MEMORY

The present invention concerns a compression scheme and in particular a display driver with a frame memory for temporarily storing image data representing a color image.

There are many applications where an image compression is performed. In image compression, several compression methods are available. The properties of natural scenes are used by compression algorithms in such a way that the introduced quality loss is acceptable for a human viewer. A method that provides satisfactory results for natural images (images with limited color fluctuation between adjacent pixels) performs badly on non-natural image types (e.g. data-graphics, text) and vice versa.

Natural images are often compressed by first converting them to the YUV domain, using a luminance and two chroma (color) components. An example of such a format is called YUV 4:4:4. As the eye is typically less sensitive to color changes over small distances, the chroma components can be shared between two adjacent pixels. This format is called YUV 4:2:2 and gives a 33% reduction of the required storage area or bus bandwidth with only a small reduction of the perceived image quality for natural scenes. When the chroma components are shared of four adjacent pixels (e.g. YUV 4:2:0) a reduction of 50% is possible. The problem with YUV 4:2:2 and YUV 4:2:0 compression is that for non-natural image types (e.g. data-graphics, text), additional artifacts are introduced that are easily visible. This is because non-natural images are not limited in bandwidth (Nyquist sampling theorem does not apply) and sharp changes in color between adjacent pixels may occur, causing visible wrong colors after compression.

For the storage of images, there are many methods of compression, which can typically be split in three types, as follows:

(1) Lossless compression (e.g., GIF, TIFF, RLE): the problem with this format is that it does not provide a fixed compression factor. Such a format cannot be used for the compression of images to be stored in the frame memory of a display driver, since the frame memory would need to be increased in size in order to be able to store all possible images.

(2) Lossy compression (e.g., JPG, MPEG): these typically use color-space conversion (YUV domain), and then frequency (DCT) conversion of the image before eliminating some information and then losslessly compressing the result. This technique requires significant processing and also a buffer memory during the conversion. This approach is not useable for compression in a frame memory because the amount of added hardware to the display driver, for example, must be minimal.

(3) Limited compression ratios (e.g., YUV): Images are often stored in YUV format, allowing for individual processing of luminance and chroma information. The analog TV transmission standards also use the YUV domain where the bandwidth used for luminance transmission is significantly higher than that used for the chroma channels. The same method is usable for reduced frame memory storage, although extensive artifacts are introduced for non-natural images.

There are various examples of smart compression methods where the compression algorithm is designed in order to avoid artifacts or the like. In particular when text is displayed on top of a natural image background, it is difficult to provide for a reliable compression that still allows the text to be displayed in legible form. Most compression methods that focus on the compression of a natural image impair or even blind out certain textual elements. A compression scheme that allows non-natural images (e.g., data-graphics, text) to be displayed does on the other hand typically not achieve the desired compression ratios. A guaranteed compression can not be achieved with the known smart compression methods if one wants at the same time to obtain a color image of high quality.

There is also prior art that relates to the compression of whole images. The following prior art documents cover computationally intensive operations based on the whole image in order to achieve a compression.

The US patents U.S. Pat. Nos. 5,361,147A and 5,818,970 concern two examples where a search for identically colored pixels is performed on the image level in order to remove these pixels from the image and therefore allow a more accurate DCT compression. The effort that is required in order to find the identically colored pixels is very high and cannot be employed in a display driver or the like. The compression techniques (DCT and LZW) used in these US patents are not comparable with YUV/RGB encoding.

The U.S. Pat. No. 5,872,556 and the US patent application, published under US 20010005218 (which issued as U.S. Pat. No. 6,597,406), both consider how to process data after a YUV 4:2:2 sub-sampling has been done. This, however, is not related to the invention proposed herein, which is dependant on the information lost during the sub-sampling process. It is important to mention that these prior art documents consider how to process the data after sub-sampling.

Memory is a precious resource in many applications. In particular in mobile applications there usually are certain constraints as to the size of the available memory. Many mobile devices nowadays are equipped with a display. The amount of frame memory needed in the display driver of such a display significantly adds to the cost of the overall device.

Thus, it would be generally desirable to provide a compression scheme for use in a frame memory of a display driver that is able to handle all types of images. Furthermore, this compression scheme should allow the size of the frame memory to be reduced. This, however, can only be achieved if a certain minimum compression ratio can be ensured (guaranteed compression ratio) independent of the type of image.

It is thus an object of the present invention to provide a compression scheme with guaranteed compression ratio.

It is a further objective of the present invention to provide a compression scheme that allows a low cost and low power implementation in a frame memory of a display driver.

It is a further objective of the present invention to improve conventional display drivers.

These disadvantages of known systems, as described above, are reduced or removed with the invention as described and claimed herein.

An apparatus in accordance with the present invention is claimed in claim 1. Various advantageous embodiments are claimed in claims 2 through 16.

According to the present invention, two or more compression formats are used to compress an image. An analysis is made of the color characteristics of two or more neighboring pixels, herein referred to as pixel cluster, before the image is compressed and stored. In the context of this analysis an error (e.g., a reconstruction error or its inversion which is a reconstruction quality) is determined. In a currently preferred embodiment the perceived quality is determined by an analysis of the anticipated error.

The outcome of the analysis leads to the choice for the better compression method for the respective pixel cluster and the data of the respective pixel cluster are compressed using the better compression method. Furthermore, the compressed data is extended by a compression-format code (qualifier), indicating which of the compression methods has been used for compressing the image data of the pixel cluster. Likewise, the compression-format code may be stored separately. The compression-format code is required by the decompression process when reading the pixel data from the frame memory for presentation of the color image on the display panel.

According to one embodiment (cf. FIG. 5) of the present invention, color images are saved in the frame memory in a combination of mutually exclusive formats being the YUV 4:2:2 format and a (occupying the same space as YUV) quantized RGB format. For each pixel cluster in an image to be stored, a choice is made to use either one of these two formats. When a pixel cluster is stored as YUV 4:2:2, it occupies the assigned storage space in memory. If a pixel cluster is stored as quantized RGB, the color depth is reduced such that the respective data fits into the same storage space.

When the storage space is limited, additional quantization of the YUV 4:2:2 data may be required.

Another embodiment to reduce the amount of respective YUV 4:2:2 data is a novel lossless color-space conversion towards an RGBG format, to fit the respective data into the available storage space.

The compression-format code indicating which of the compression methods has been used for compressing the image data of the pixel clusters may be stored together with each of the pixel clusters, or the respective information may be stored separately.

By intelligently selecting when to store a pixel cluster in the image in YUV 4:2:2 format and when to store it in quantized RGB format, the present invention allows to increase the number of displayable colors in comparison to a conventional RGB storage. The method described and claimed will not introduce visible artifacts for non-natural images that would otherwise occur when storing the image in pure YUV 4:2:2 format.

Methods in accordance with the present invention are claimed in the independent claims 17 and 21. Various advantageous embodiments are claimed in claims 18 through 20 and 22 through 28.

According to the present invention, the new compression format can be used to replace the conventional YUV compression scheme in many different applications to enhance its performance. It can for example be used in connection with the transfer of embedded camera image data, the storage of image data in memory or the transfer of image data towards a display module.

Another embodiment of the invention is characterized in that the perceived quality is considered when deciding which of the compression schemes is to be used for a given pixel pair.

The inventive compression method has the advantage that it handles different image types in a satisfactory way.

The compression scheme(s) according to the present invention can be used for on-the-fly compression of image data when transferring them to the frame memory of a display driver.

According to the present invention, when compressed image data is read from the frame memory, an inverse operation (on-the-fly decompression) is employed before delivering the "re-constructed" image data via some additional circuitry, such as a frame rate converter and a digital-to-analog converter, to a display panel.

The present invention allows to reduce quantization artifacts introduced by the compression without significant processing, power or cost impact.

Another advantageous property of the compression according to the present invention is that it provides for a guaranteed compression ratio. A further advantageous property of the invention is that it does not require as much processing as some of the methods described before. The present invention can thus be implemented in mobile devices, for instance.

Additional features and advantages of the invention will be set forth in the description that follows, and in part will be apparent from the description.

For a more complete description of the present invention and for further objects and advantages thereof, reference is made to the following description, taken in conjunction with the accompanying drawings, in which:

FIG. 9A-9C show screenshots of an original image without compression, a compressed image using a first of the compression schemes presented herein, and a compressed image using a second of the compression schemes presented herein (from left to right);

FIG. 10 shows the data flow from the input side to the output side, according to the present invention.

Before addressing detailed embodiments of the invention, some basic information about conventional conversion and compression schemes is given.

A color image, as processed by a display driver for instance, is quite often presented in an RGB format. This is a format where the pixels of a color image are composed of red (R), green (G) and blue (B) components.

The YUV format expresses the pixel properties in terms of luminance (Y) and chrominance (U, V) components. Luminance, or luma, refers to the black-and-white information in the image data and chrominance, or chroma, refers to the color information in the image data. The YUV color space differentiates between luminance and chrominance properties that now can be treated separately.

Figure 1:
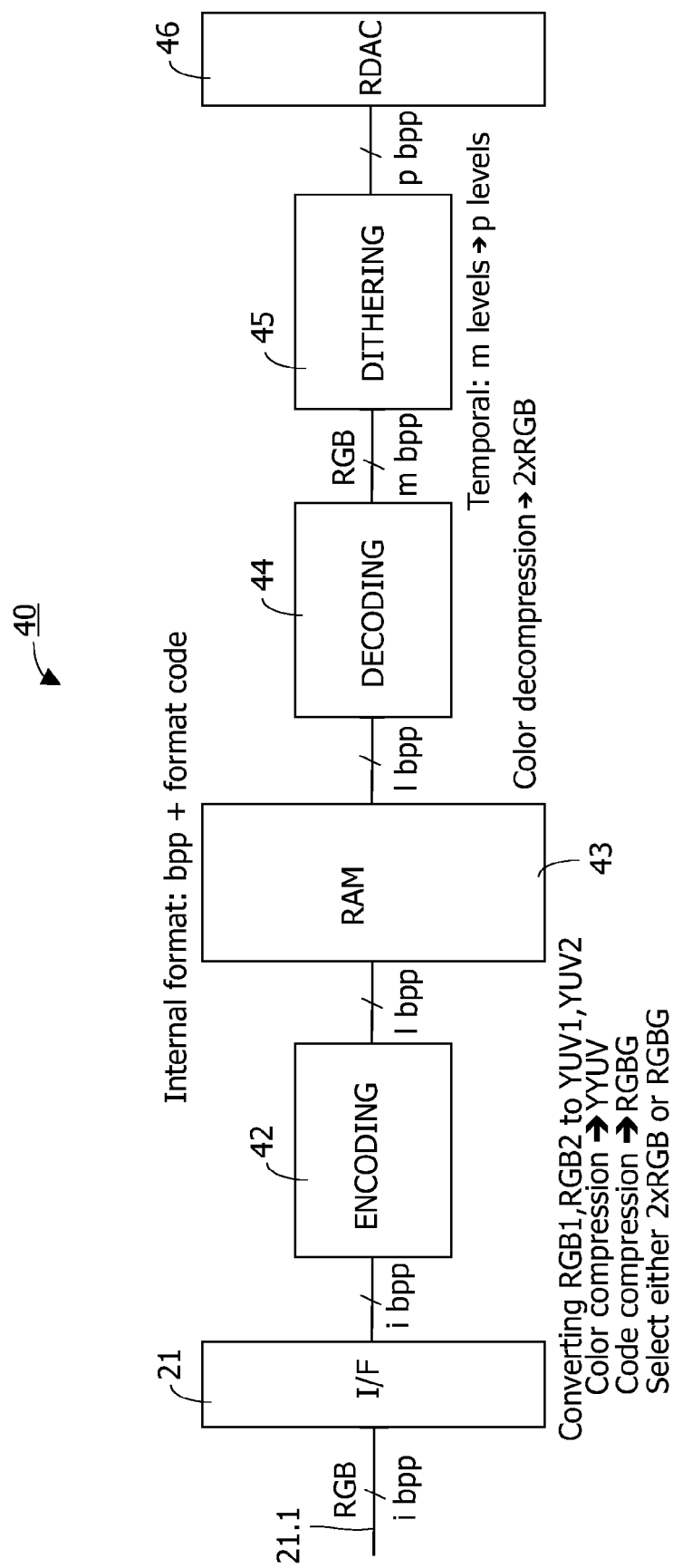
FIG. 1 shows a schematic block diagram of a first embodiment, according to the present invention, where RGB data is encoded before being stored in a frame memory and decoded after retrieval from said memory.

A first embodiment of the present invention is presented in FIG. 1. The circuit 40 of FIG. 1 may be part of a display driver, for instance, and comprises a frame memory 43 (e.g., a RAM) for temporarily storing image data representing a color image. The RAM 43 may have in the present embodiment a 16 bpp internal format, for example. A data bus 21.1 is provided for feeding RGB-formatted image data via an interface block 21 (I/F) and encoding block 42 to the frame memory 43. For example 24 bpp RGB formatted image data may enter the encoding block 42 via the interface block 21. According to the present invention, there are means for performing a decision process, not explicitly depicted in FIG. 1. Said decision process is based on an analysis of the color characteristics of a pixel cluster of the image data received via the bus 21.1. The means for performing a decision process allow the circuit 40 to decide whether a first compression format (RGB quantized) or a second compression format (color compressed) is to be applied for compression of the pixel cluster. In the present embodiment, the encoding block 42 comprises first compression means performing a compression of the pixel cluster into the first compression (RGB quantized) format, and second compression means performing a compression of the pixel cluster into the second (color compressed) format. In accordance with the present invention the first compression format or the second compression format is selected based upon the results of the decision process.

Figure 3A:
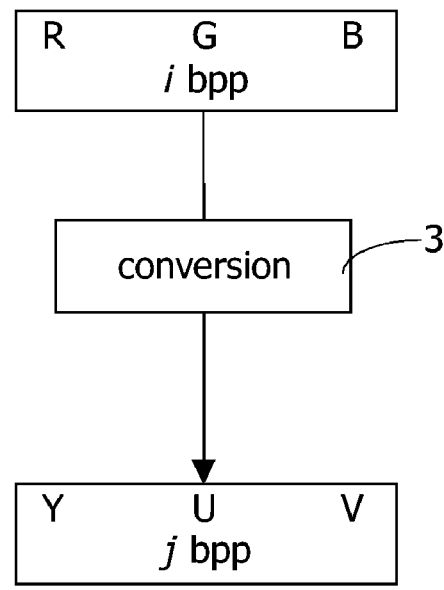
FIG. 3A is a schematic representation of an RGB to YUV 4:4:4 conversion.
Figure 3B:
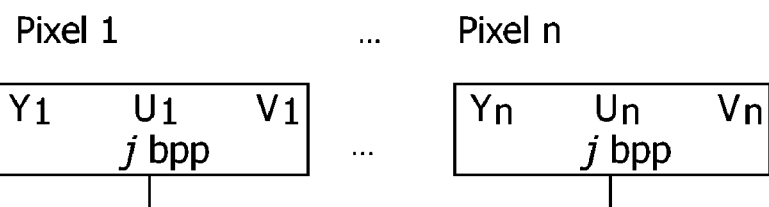
FIG. 3B is a schematic representation of a $Y_1 U_1 V_1 \ldots Y_n U_n V_n$ to $Y_1 \ldots Y_n UV$ compression with averaging of the U and V components of a plurality of adjacent pixels (pixel cluster)
Figure 3B:
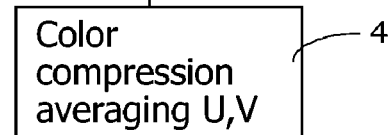
Figure 3B:
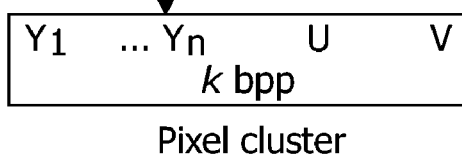
Figure 3C:
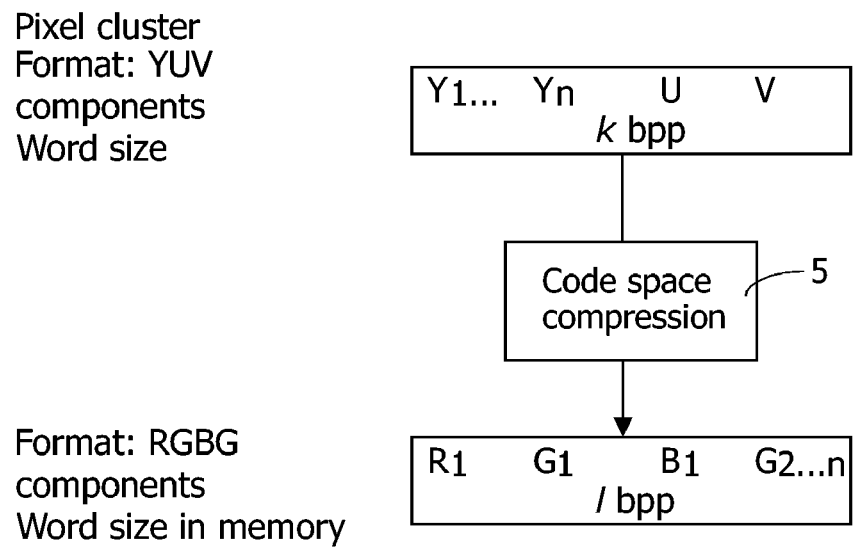
FIG. 3C is a schematic representation of a $Y_1 \ldots Y_n UV$ to $R_1 G_1 B_1 G_2 \ldots G_n$ compression of a cluster of pixels.

In this example, the encoding block 42 collects two adjacent pixels (referred to as $RGB_1$ and $RGB_2$), converts them to YUV (referred to as $YUV_1$ and $YUV_2$), averages the U and V components (the result of which is referred to as YYUV in FIG. 3C) and converts them back to a novel and inventive average RGBG representation (cf. FIG. 3C). The representation has 32 bits (holding two compressed pixels) if the RGB formatted word at the input bus 21.1 has two pixels of 24 bits. The 32 bits represent the original two pixels and thus correspond to 16 bpp. The initial 24 bpp representation has thus been transformed (compressed) into a 16 bpp representation (compression factor of 24/16=1.5). This whole operation can be described with one encoding matrix only, as follows:

$$\text{Encoding matrix} \begin{bmatrix} \overline{R}_1 \\ \overline{G}_1 \\ \overline{B}_1 \\ \overline{G}_2 \end{bmatrix} = \quad (1)$$

$$\frac{1}{8} \cdot \begin{bmatrix} 5.196 & 2.348 & 0.456 & 2.804 & -2.348 & -0.456 \\ 1.196 & 6.348 & 0.456 & -1.196 & 1.652 & -0.456 \\ 1.196 & 2.348 & 4.456 & -1.196 & -2.348 & 3.544 \\ -1.196 & 1.652 & -0.456 & 1.196 & 6.348 & 0.456 \end{bmatrix} \cdot \begin{bmatrix} R_1 \\ G_1 \\ B_2 \\ R_2 \\ G_2 \\ B_2 \end{bmatrix}$$

The implementation of the matrix (1) can be reduced by selecting rounded values for the matrix coefficients.

Subsequently, the data representing the pixel clusters are retrieved from the frame memory 43 for feeding them to a display panel. Depending on the kind of application, the retrieval and decompression, as performed by a decoding unit 44, may be done about 50 times per second. In order to be able to decompress the data retrieved from the memory 43, the compression-format code is considered (the considering of the compression-format code is hereinafter referred to as second decision process) and either first decompression means are employed to perform a decompression of the respective pixel cluster into a cluster of RGB format based pixels, or second decompression means are employed to perform a decompression of the color compressed pixel cluster into a cluster of RGB format based pixels.

When the pixels are read from the frame memory 43, the two missing sub-pixels R2 and B2 have to be calculated in this example. This can be done with the following matrix (2):

$$\begin{bmatrix} \overline{R}_1 \\ \overline{G}_1 \\ \overline{B}_1 \\ \overline{R}_2 \\ \overline{G}_2 \\ \overline{B}_2 \end{bmatrix} = \begin{bmatrix} 1 & 0 & 0 & 0 \\ 0 & 1 & 0 & 0 \\ 0 & 0 & 1 & 0 \\ 1 & -1 & 0 & 1 \\ 0 & 0 & 0 & 1 \\ 0 & -1 & 1 & 1 \end{bmatrix} \cdot \begin{bmatrix} \overline{R}_1 \\ \overline{G}_1 \\ \overline{B}_1 \\ \overline{G}_2 \end{bmatrix} \quad (2)$$

As can be seen from the matrix (2), only three adders are required inside the RGBG to RGB decoder 44 (de-compressor). One for calculating the difference between G2 and G1 and one for each missing sub-pixel.

According to the present invention, typically part of the data thus is stored in the frame memory 43 in the first compression format and another part of the data is stored in the second compression format.

In the following sections, details of the various transformation steps are described. In this context, reference is made to the FIGS. 2A through 3D.

Figure 2A:
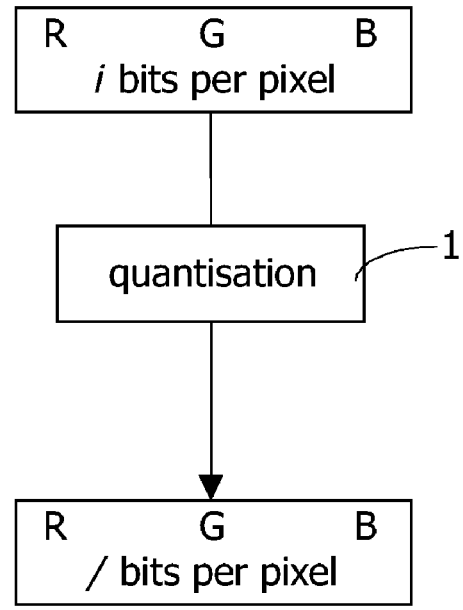
FIG. 2A is a schematic representation of an RGB to RGB quantization that is performed prior to storing data in a frame memory. This format is only used when it produces better results then the YUV 4:2:2 format.

A first compression scheme is illustrated in FIG. 2A. One pixel of the image data of a color image is represented by its red (R), green (G), and blue (B) color components. The three color components together use i bits per pixel on the interface. If i=24, then one pixel requires 24 bits, for example. If one now performs an RGB quantization, as indicated in FIG. 2A by the box 1, the individual color components are expressed by fewer bits (1 bits per pixel, with 1<i). The 8 bits R can be compressed to 5 bits R, the 8 bits G can be compressed to 6 bits G, and the 8 bits B can be compressed to 5 bits B to construct an RGB565 pixel, for instance. In this case one pixel now requires only 16 bits, which corresponds to a compression factor of 24/16=1.5. The simplest compression algorithms that can be employed in this context are truncating and rounding.

Figure 2B:
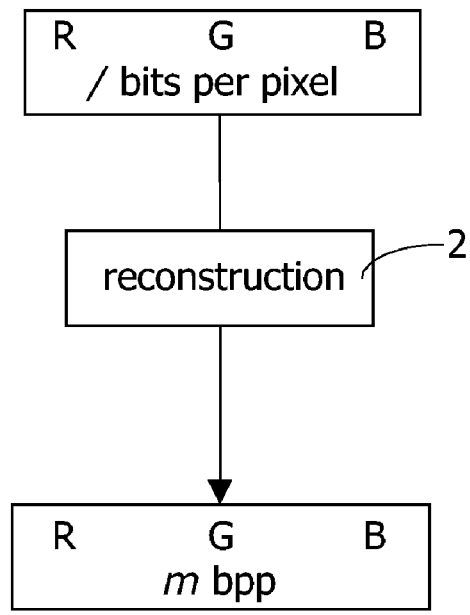
FIG. 2B is a schematic representation of a quantized RGB to reconstructed RGB presentation that is performed when retrieving data from the frame memory, that is stored in quantized format.

In FIG. 2B a schematic representation of a quantized RGB to reconstructed RGB format is illustrated that may be performed when retrieving data from the frame memory 43. The word size in the frame memory 43 is 1 bits per pixel. After the decompression, the word size of the data transmitted onto the display is m bits per pixel.

Another conversion scheme is illustrated in FIG. 3A. As in FIG. 2A, one pixel is represented by its red (R), green (G), and blue (B) color components and requires i bits (if the RGB formatted data at the input bus 21.1 is provided in the RGB888 format then i=24 bpp). If one now performs an RGB to YUV 4:4:4 conversion, as indicated in FIG. 3A by the box 3, the color components are converted into a luminance component (Y) and two chroma components (U, V). To avoid loss of information during this color-space conversion process, 2 extra bits per component are required (YUV101010). In this format the pixel thus requires 30 bits.

Another compression scheme is illustrated in FIG. 3B. There are n adjacent pixels (Pixel 1 through Pixel n) being processed together (referred to as pixel cluster). Each pixel is represented by a 10 bit luminance component Y and two 10 bit chroma components U, V (i.e., j=30 bpp). Each pixel requires 30 bits (YUV101010), as mentioned above. According to this compression scheme, the n=2 pixels are processed together to generate a YYUV representation where the n=2 individual luminance components $Y_1$ and $Y_2$ are maintained and the two U components $U_1$, $U_2$, and the two V components $V_1$, $V_2$ are merged (color compression by means of averaging). The combined components are designated by U and V. The new format represents two 30 bit words now as a single 40 bit word (YYUV10101010), that is k=20 bpp. This corresponds to a compression factor of 60/40=1.5.

In FIG. 3C a schematic representation of a YYUV to RGBG code space compression is given (n=2 in this example). The data in the YYUV format has k=20 bits per pixel. After the code space compression the RGBG formatted data has l=16 bpp with l=k−(n+2). The overall compression factor from RGB input to the RGBG format is 24/16=1.5.

Figure 3D:
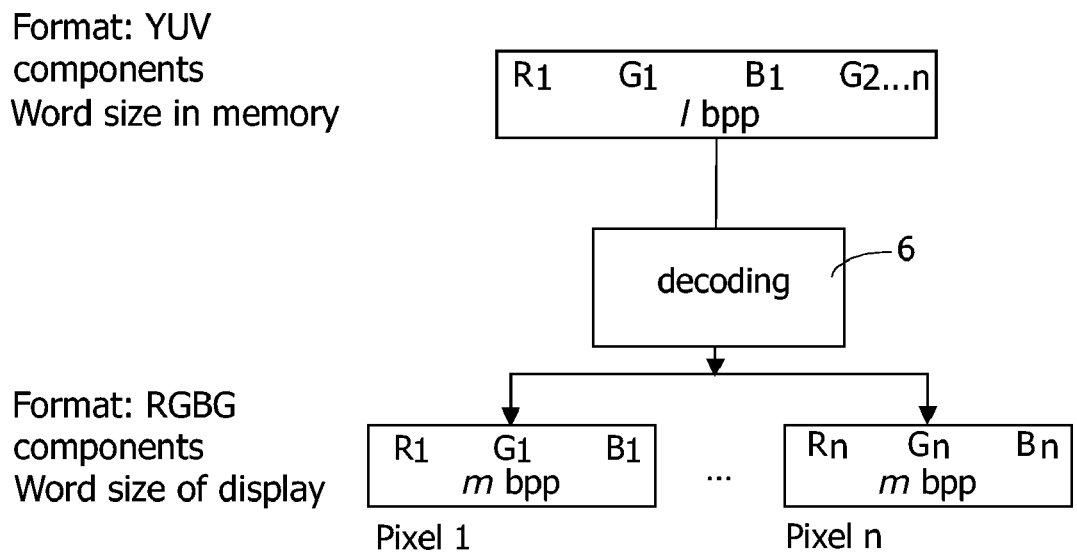
FIG. 3D is a schematic representation of the decompression of $R_1 G_1 B_1 G_2 \ldots G_n$ to the individual pixels of a cluster represented in an RGB format.

In FIG. 3D a schematic representation of an RGBG to RGB reconstruction is illustrated that may be performed when retrieving data from the frame memory 43. The word size in the frame memory 43 is l=16 bits per pixel. After the decompression, the word size of the data transmitted onto the display is m=24 bits per pixel The overall compression factor only depends on the size n of the pixel cluster and is equal to C=3n/(n+2)=>(3*n=2)/(n=2+2)=1.5 in this example.

As stated in the introduction of this specification, neither the conventional RGB compression nor the conventional YUV compression would be suitable since, depending on the nature of the color image, certain disturbing visible effects would occur. Hence the above-described approaches have been developed to provide for a guaranteed compression independent of the type of image.

Since the present invention primarily concerns the compression, storage and decompression of image data in a display driver, an example of a display module 10 and display drivers is now described in connection with FIG. 4.

Figure 4:
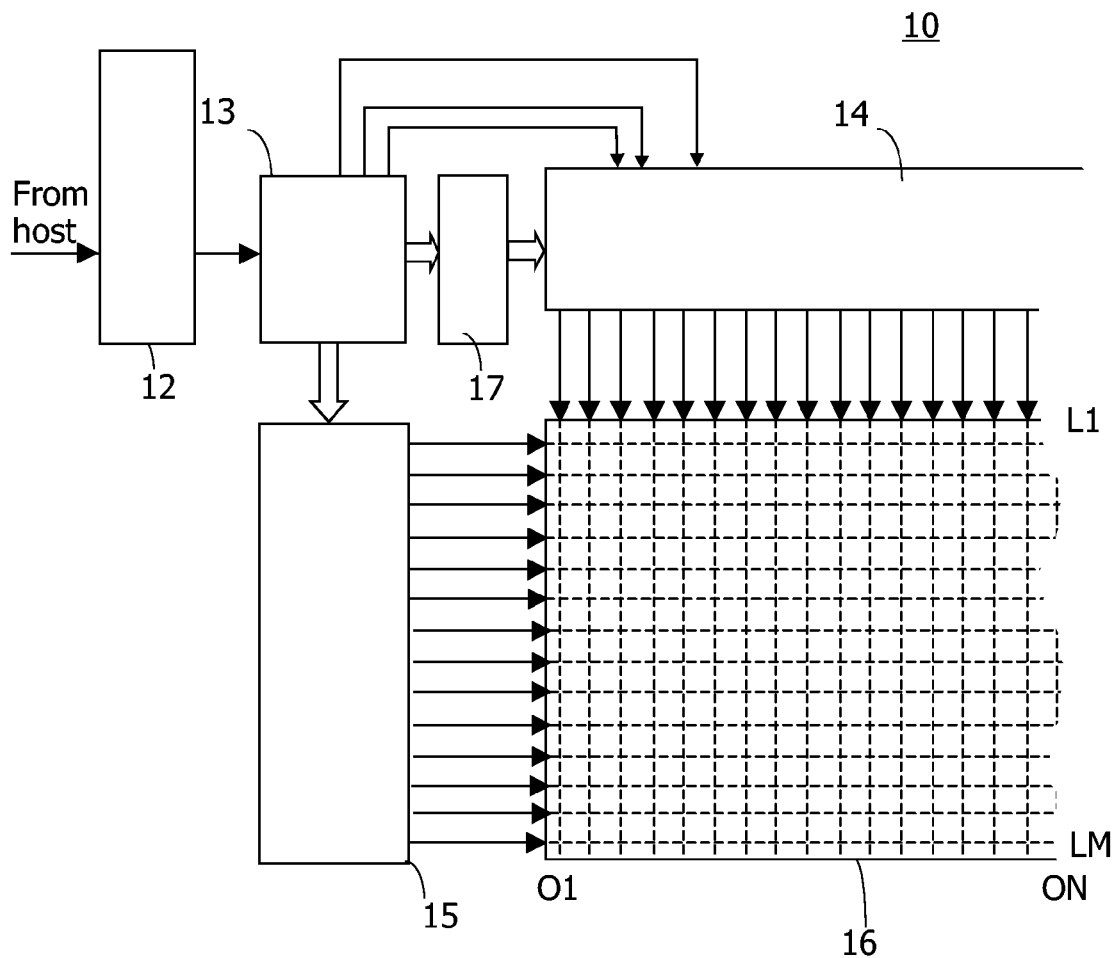
FIG. 4 shows a schematic block diagram of a display module, according to the present invention.

FIG. 4 shows a block diagram of a conventional (TFT) display module 10. Details of the electrical configuration for driving a simple matrix type liquid crystal panel 16 are illustrated. A plurality of column electrodes (with N=384, for example) of the liquid crystal panel 16 are driven in parallel by a column driver bank 14 and a plurality of common row electrodes are driven by a row driver array 15 while being selected sequentially. An interface 12 is used as the interface between a microcontroller (not illustrated in FIG. 4) and the display module 10. The interface function 12 is typically realized at the input side of a display timing controller 13. The column driver bank 14 drives, as mentioned, the N columns of the LCD display 16 and it comprises N individual output buffers. The column driver bank 14 comprises an array of column drivers. Typically, each column driver of the column driver bank 14 serves N column electrodes of the display panel 16 by providing analog output signals. The row driver array 15 comprises an array of row drivers. Each pixel of the display 16 is a switchable capacitor between a row and a column electrode. The display 16 may be a passive matrix LCD panel, for example.

As illustrated in FIG. 4, there is a frame memory 17 located between the display timing controller 13 and the column driver bank 14. This frame memory 17 (typically a RAM) temporarily stores image data, after having been compressed in accordance with the present invention. Image data, which represent an image to be displayed on the liquid crystal panel 16, are given by the timing controller 13 via the frame memory 17 to the column driver 14 as serial data.

The output of the frame buffer 17, after having been decompressed on the fly, may be sent via a digital-to-analog converter to the column drivers inside the column driver bank 14. The data is transferred to the outputs of the column drivers in order to drive the display panel 16. Typically, an RDAC is employed as digital-to-analog converter. An RDAC is a resistor-based implementation of a digital-to-analog converter. The RDAC comprises a series of resistors (also referred to as resistor divider chain).

As discussed above, the size of the frame memory (e.g., frame memory 17 in FIG. 4) is typically limited due to cost or other constraints. It is thus advantageous to provide for a compression of the image data, as described above, in order to make sure that they "fit" into the available storage area. One important issue is that, as discussed above, one needs a guaranteed compression factor and that conventional compression schemes are either too complex for implementation in a display driver or result in an image quality that is not acceptable for many applications.

Figure 5:
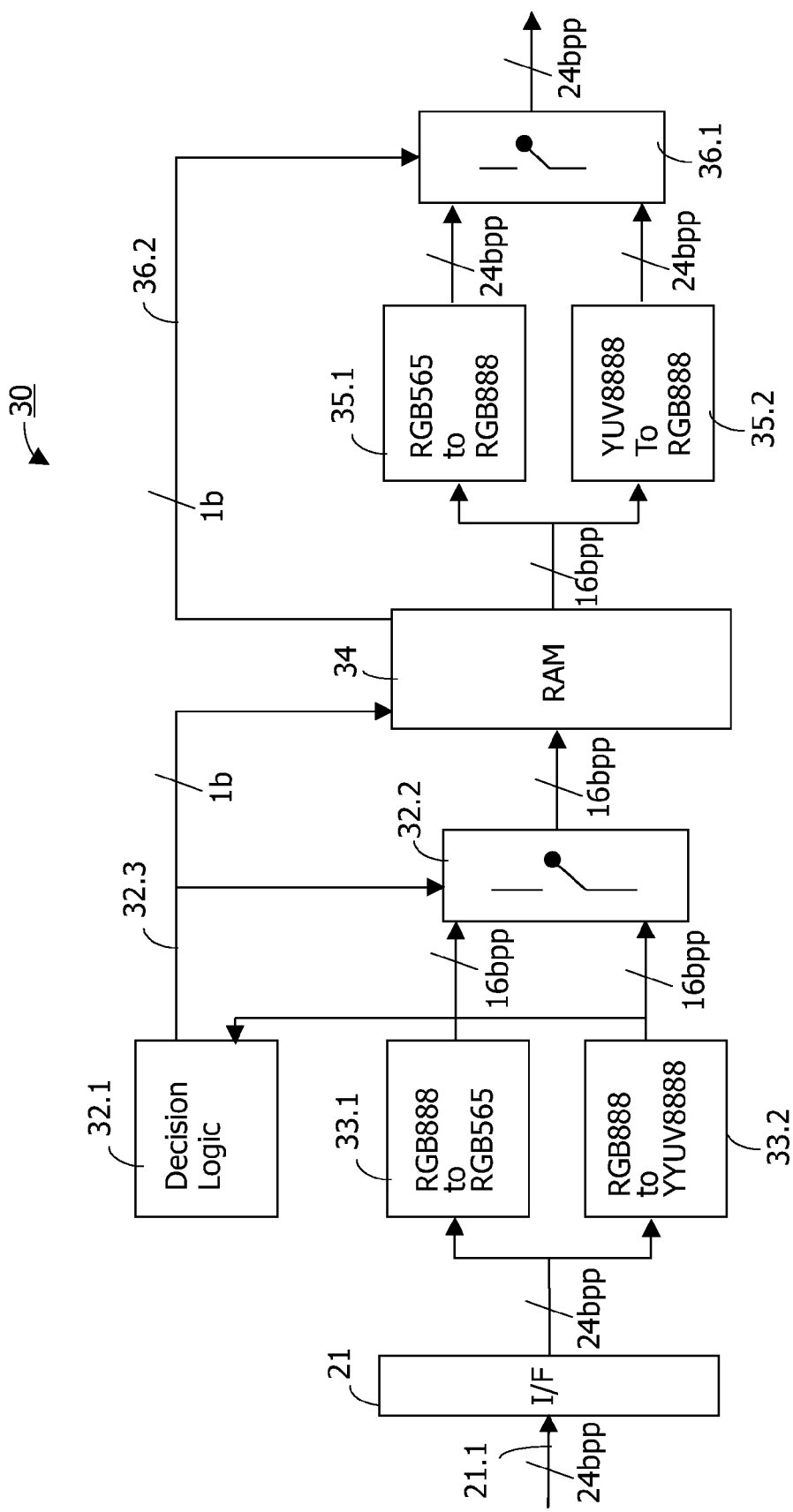
FIG. 5 shows a schematic block diagram of a third embodiment, according to the present invention.

According to a second embodiment of the present invention, depicted in FIG. 5, at least two different compression formats are used to compress an image before it is being stored in a frame memory 34 (RAM). In order to be able for the display driver 30 to decide which compression format is to be used, an analysis is made of at least two neighboring pixels when receiving image data via a bus 21.1 and an interface block 21 (I/F).

A decision block 32.1 is employed in the present example. The decision block 32.1 takes two adjacent pixels (pixel pair) or more than two adjacent pixels (pixel cluster) and performs a decision process, said decision process being based on an analysis of the nature of the pixel pair or pixel cluster. The color differences of $U_1$, $U_2$ and $V_1$, $V_2$ data are compared with a predefined threshold. Based on the comparison of the decision block 32.1, the image data of the respective pixel pair or pixel cluster are either compressed by the first compression means 33.1 or by the second compression means 33.2. The first compression means 33.1 apply a first compression format providing for an RGB888 to RGB565 conversion where the color depth is reduced to limit the storage area required in the frame memory 34. This conversion can be done on a pixel-by-pixel basis, that is each pixel is converted individually, as follows:

$$RGB888 \text{ to } RGB565 \text{ conversion: } \begin{aligned} R &= \frac{R}{8} \\ G &= \frac{G}{4} \\ B &= \frac{B}{8} \end{aligned}$$

The second compression means 33.2 apply a second compression format providing for a 2xRGB888 to YYUV8888 compression where the U and V components of the pixel pair or pixel cluster are averaged and the Y, U and V components are reduced to 8 bit by truncating or averaging. Please note that this second compression is not done on a pixel-by-pixel basis. Two or more pixels are combined when doing the necessary averaging.

The compressions performed by the compression means 33.1 and 33.2 require conversion matrices to be employed, as given below.

$$RBG \text{ to } YUV \text{ 4:4:4 matrix } \begin{bmatrix} Y \\ U \\ V \end{bmatrix} = \begin{bmatrix} 0.299 & 0.587 & 0.114 \\ -0.169 & -0.331 & 0.500 \\ 0.500 & -0.419 & -0.081 \end{bmatrix} \cdot \begin{bmatrix} R \\ G \\ B \end{bmatrix}$$

Averaging $U$ and $V$:
$$\overline{U} = \frac{U_1 + U_2}{2}$$
$$\overline{V} = \frac{V_1 + V_2}{2}$$

Bit reduction by truncation:
$$Y_1 = Y_1/4$$
$$Y_2 = Y_2/4$$
$$\overline{U} = \overline{U}/4$$
$$\overline{V} = \overline{V}/4$$

The compressed image data is then stored in an available storage area of the frame memory 34. A whole image, as represented by the corresponding image data, is thus in the majority of cases stored in two different formats in the frame memory 34. Typically, some image data in the frame memory 34 is RGB quantized and some data is color compressed.

In order for the display driver 30 or 40 to be able to retrieve image data from the frame memory 43 or 34 and to perform de-compression, it is necessary to store additional information that allows the circuit to determine whether the first or second compression format was used for a given pixel pair or cluster. This can be done by storing a compression-format code, as illustrated in FIG. 5. The decision logic 32.1 provides a compression-format code as output signal. This compression-format code is fed via a bit line 32.3 to a compression format selector 32.2 and to the frame memory 34. In the present embodiment the compression-format code in fact serves two purposes. Firstly, it selects the result of the respective compression means 33.1, 33.2. Secondly, it is stored together with the pixel data or in a separate storage area of the frame memory 34. The decision logic 32.1 can be realized such that the compression-format code is a logic one if the first compression format is to be used. If a logic one is applied to the compression means 33.1, these means 33.1 is selected while the logic one at the same time disables the compression means 33.2. If a logic zero is issued by the decision logic 32.1, the compression means 33.2 is selected and the compression means 33.1 are disabled.

In the embodiment of FIG. 5 the decision logic based upon a fixed threshold can be replaced by an adaptive switch control, which is based upon a minimum error criterion. Examples of such minimum error-based implementations are given in FIGS. 7 and 10. The decision logic 32.1 makes a decision allowing the circuit 30 to decide whether a first compression format or a second compression format is to be applied for compression of the pixel cluster. Two compression means 33.1 and 33.2 are arranged parallel to the decision logic 32.1. Each of the compression means 33.1, 33.2 applies a different compression scheme. At the output side there is a switching circuit 32.2 that allows either the pixel cluster after compression by the first compression means 33.1 or the pixel cluster after compression by the second compression means 33.2 to be fed to the frame memory 34. The switching circuit 32.2 is in the present embodiment controlled by the decision logic 32.1 via a bus 32.3.

The compressions performed by the compression means 33.1 and 33.2 require conversion matrices to be employed. This is typically done in hardware by means of a number of logic gates.

As described in connection with FIGS. 1 and 5, a compression-format code is stored that indicates which compression format was used for which pixel cluster. The compression-format code is fed via a bit line 32.3 to the frame memory 34. This is important for a later retrieval and de-compression of the respective pixel clusters.

At the output side of the frame memory 34 there are two decoding blocks 35.1, 35.2 that perform an RGB565 to RGB888 and a YYUV8888 to RGB888 conversion, respectively. Switching means 36.1 are employed in order to feed the RGB888 data to the display panel. The switching means 36.1 are controlled by the 1 bit compression-format code retrieved from the memory 34 and fed via a bus 36.2 to the switching means 36.1.

The decompression is based on the following equations:

$$RGB565 \text{ to } RGB888 \text{ conversion } 35.1: \begin{array}{l} R = R*8 \\ G = G*4 \\ B = B*8 \end{array}$$

$YUV888$ to $RGB888$ matrix 35.2:

$$\begin{bmatrix} \overline{R}_n \\ \overline{G}_n \\ \overline{B}_n \end{bmatrix} = \begin{bmatrix} 1.000 & 0.000 & 1.402 \\ 1.000 & -0.344 & -0.714 \\ 1.000 & 1.772 & 0.000 \end{bmatrix} \cdot \begin{bmatrix} Y_n \\ U \\ V \end{bmatrix}$$

At the output side of the frame memory 34 there is a bus that connects the frame memory 34 with means for de-compression 35.1 and 35.2. From there the decompressed data (now in RGB888 format again) may be fed via an RDAC to the display panel.

In the following some further embodiments are described that are variations of the embodiments described so far. The basic idea of the present invention will be further expanded. The novel RGBG compression scheme presented in connection with FIG. 1 is also made use of in connection with FIG. 6 and FIG. 7. This novel compression format can be used in connection with a display driver in accordance with the present invention, but this compression format can also be used in many other applications where image data is to be compressed.

The embodiments described hereinafter are based on the following observations and findings. The pixel colors can be represented as vectors in a 3 dimensional RGB color space that has the shape of a square prism. When performing an RGB to YUV conversion, the pixel colors are represented in another 3 dimensional color space, the YUV code space, as illustrated by the following matrix.

$$RBG \text{ to } YUV \text{ 4:4:4 matrix } \begin{bmatrix} Y \\ U \\ V \end{bmatrix} = \begin{bmatrix} 0.299 & 0.587 & 0.114 \\ -0.169 & -0.331 & 0.500 \\ 0.500 & -0.419 & -0.081 \end{bmatrix} \cdot \begin{bmatrix} R \\ G \\ B \end{bmatrix}$$

Since the original RGB space is rotated and stretched when performing the coordinate transformation into the YUV code space, a large part of the YUV code space will never be addressed and 2 extra bits per component are required to avoid loss of data of the pixel color vector, as was described above in connection with FIG. 3A.

An RGB888 color image, with 24 bits per pixel (bpp), can address more than 16 million colors. During the RGB to YUV color space conversion no data is lost. When quantizing the resulting YUV101010 (30 bpp) back to YUV888 (24 bpp) the color resolution will reduce to approximately 5 million colors due to the loss of codes.

$$\text{Bit reduction by truncation: } \begin{aligned} Y &= Y/4 \\ \overline{U} &= \overline{U}/4 \\ \overline{V} &= \overline{V}/4 \end{aligned}$$

The averaging of U and V of two adjacent pixels will not introduce visible artifacts when these pixels have about the same color. A detailed analysis shows that for natural images quite often two or more adjacent pixels have about the same color. If one were to use the YUV compression with averaging of the U and V components (see the below equations) of adjacent pixels of a natural image, one would be able to perform compression without reducing the perceivable image quality too much. It turns out though that displaying a color image, after it was YUV compressed and de-compressed, does not look good if there is colored text on contrasting colored background. An embodiment avoiding this problem at least to some extent will be described in connection with FIGS. 9A-9C and FIG. 11.

$$\text{Averaging } U \text{ and } V: \begin{aligned} \overline{U} &= \frac{U_1 + U_2}{2} \\ \overline{V} &= \frac{V_1 + V_2}{2} \end{aligned}$$

The transition between the background and text may show color errors, which can be very disturbing when trying to read such a text on the display. Screenshots of the display of a personal digital assistant are presented in FIGS. 9A-9C. As becomes apparent from these Figures, a lossy compression as described before may lead to visible reconstructions errors (cf. FIG. 9B).

A YUV color vector must be multiplied with a matrix before it can be used to generate, as RGB data, an image on the display panel. This multiplication is expressed by the following equation.

$$YUV888 \text{ to } RGB888 \text{ matrix: } \begin{bmatrix} R \\ G \\ B \end{bmatrix} = \begin{bmatrix} 1.000 & 0.000 & 1.402 \\ 1.000 & -0.344 & -0.714 \\ 1.000 & 1.772 & 0.000 \end{bmatrix} \cdot \begin{bmatrix} Y \\ U \\ V \end{bmatrix}$$

Taking this into consideration, the novel RGBG compression scheme presented herein makes it possible to compress a YUV coded image, store it in a frame memory, retrieve it from the frame buffer and decompress it again without loss of code space. In this way the initial color resolution of 16 million colors is maintained. An embodiment of the present invention that makes use of the new compression scheme is depicted in FIG. 6.

Figure 6:
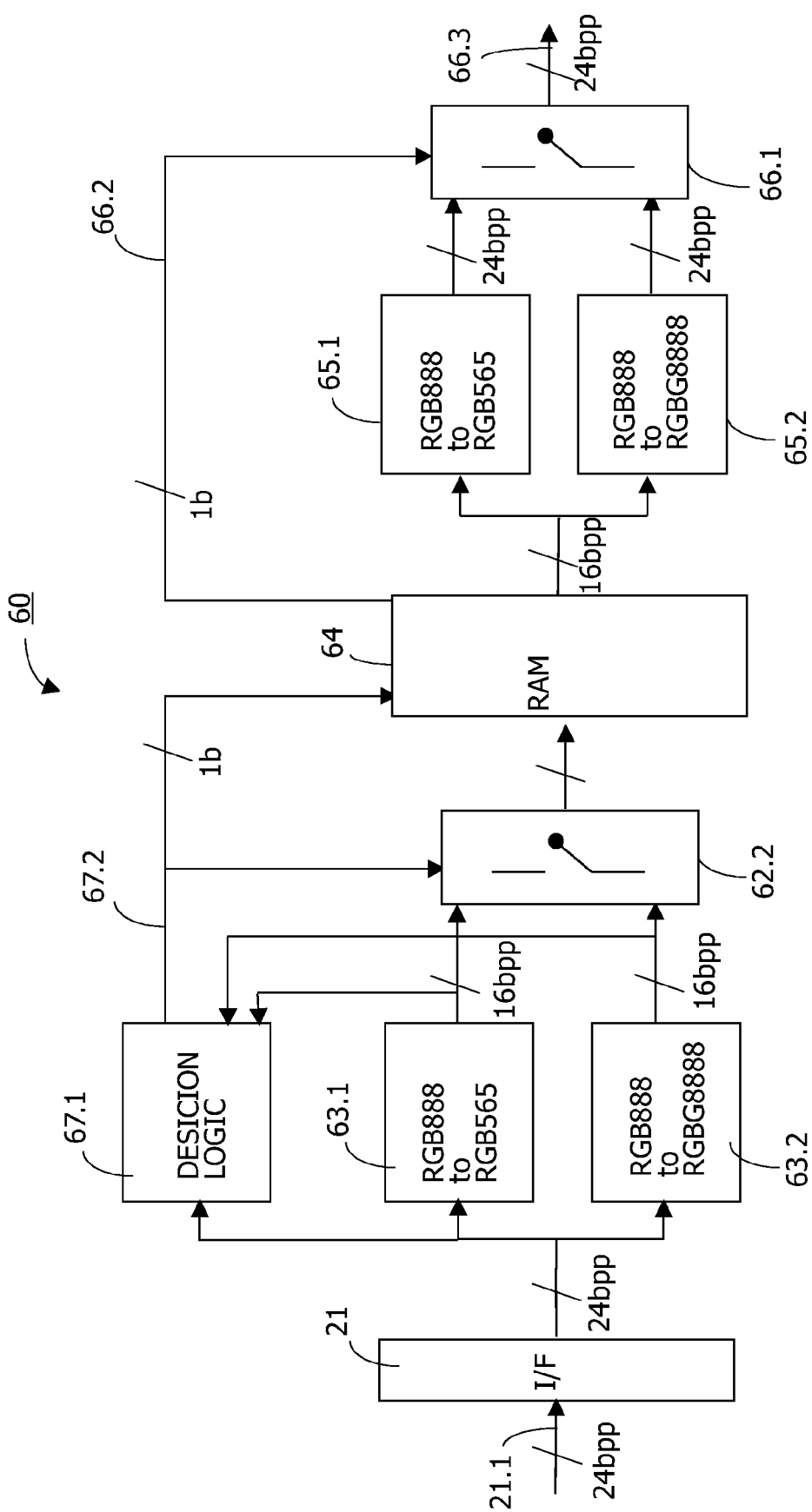
FIG. 6 shows a schematic block diagram of a fourth embodiment, according to the present invention.

In the following, yet another embodiment is described that implements what was described in connection with FIG. 1, and a corresponding circuit 60 is shown in FIG. 6. This circuit 60 provides better results and fewer artifacts (especially with data graphics). The circuit 60 of FIG. 6 may be part of a display driver, for instance, and comprises a frame memory 64 (e.g., a RAM) for temporarily storing image data representing a color image. The RAM 64 may have in the present embodiment a 16 bpp internal format, for example. A data bus 21.1 is provided for feeding RGB-formatted image data via an interface block 21 (I/F) and the encoding blocks 63.1, 63.2 to the frame memory 64. For example 24 bpp RGB formatted image data may enter the encoding blocks 63.1, 63.2 via the interface block 21. According to the present invention, there are means 67.1 for performing a decision process. The decision process is based on an analysis of the color characteristics of a pixel cluster of the image data received via the bus 21.1. The means for performing a decision process 67.1 allow the circuit 60 to decide whether a first compression format (RGB quantized) or a second compression format (RGBG color compressed) is to be applied for compression of the pixel cluster. In the present embodiment, the encoding block 63.1 performs a compression of the pixel cluster into the first compression (RGB quantized) format, and the encoding block 63.2 performs a compression of the pixel cluster into the second (RGBG color compressed) format. In accordance with the present invention the first compression format or the second compression format is selected based upon the results of the decision process. Switching means 62.2 is employed for routing the respective output data of the encoding blocks 63.1, 63.2 to the memory 64. A one bit compression-format code is fed via a bus 67.2 to the switching means 62.2 and the memory 64.

A decompression is done at the output side of the memory 64 upon retrieval of the data from the memory 64. A first decoding block 65.1 and a second decoding block 65.2 are employed, respectively. Switching means 66.1 apply the respective data to an output bus 66.3. The switching means 66.1 are controlled by the compression-format code retrieved from the memory 64 and fed via a bus 66.2 to a control input of the switching means 64.

Figure 7:
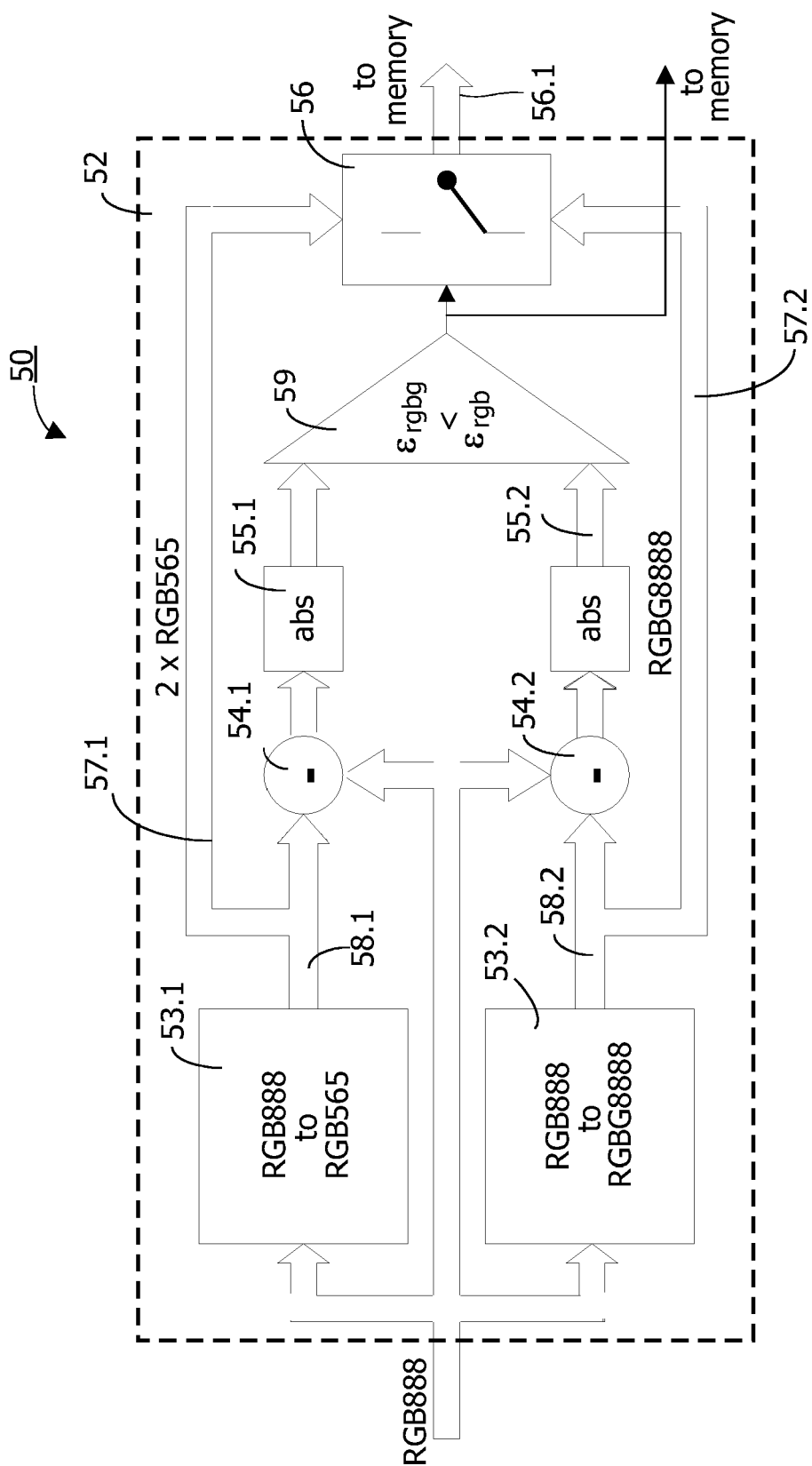
FIG. 7 shows a schematic block diagram of a fifth embodiment, according to the present invention.

A circuit 50 is illustrated in FIG. 7. With the decision circuit (54.1, 54.2, 55.1, 55.2 and 59), it is possible to directly compare the quantized RGB pixels and RGBG converted pixels with the original RGB888 input on the left hand side of FIG. 7. The image data are fed into a first encoding block 53.1 (RGB888 to RGB565 converter) and into a second encoding block 53.2 (RGB888 to RGBG888 converter). At the output side 58.1, the first converter block 53.1 makes the quantized result of two pixels (2×RGB565) available. The second converter block 53.2 provides a YUV converted pixel pair (RGBG8888) that corresponds to the same two pixels at its output 58.2. The difference between the quantized pixel pair (2×RGB565) and the corresponding original RGB888 input pixel pair is used to calculate the color error of the RGB compression. The difference of the RGBG compressed pixel pair (RGBG8888) and the corresponding original RGB888 input pixel pair is used to calculate the color error of the RGBG compression.

$$\epsilon_{quantised} = \epsilon_{rgb} = |R_1 - 8R_{1Q}| + |G_1 - 4G_{1Q}| + |B_1 - 8B_{1Q}| + |G_2 - 4G_{2Q}| \quad (3)$$

$$\epsilon_{colorcompressed} = \epsilon_{rgbg} = |R_1 - \overline{R_{1C}}| + |G_1 - \overline{G_{1C}}| + |B_1 - \overline{B_{1C}}| + |G_2 - \overline{G_{2C}}| \quad (4)$$

The first equation (3) calculates the sum of the absolute color component errors ($\epsilon_{rgb}$) of the quantized sub-pixels and the second equation (4) does the same (error $\epsilon_{rgbg}$) for the color compressed sub-pixels. A comparator block 59 is employed that evaluates the results by comparing the errors as if($\epsilon_{colorcompressed} > \epsilon_{quantised}$)

follows: then(select $\Rightarrow$ RGB565format)

else(select $\Rightarrow$ RGBGformat)     (5)

The equation (5) shows that the compression type is selected adaptively based on an ad-hoc determination of the color error. Only when the RGBG pixel-pair has a smaller error than the RGB quantized pixel-pair, the color compression format is selected. The $R_2$ and $B_2$ pixels can also be taken into account, as will be addressed in connection with FIG. 11, but additional processing would be required in that case.

According to the present invention, the result of the decision performed by the comparator block 59 (either encode as RGB565 format or encode as RGBG8888 format) is added as one bit of information (compression-format code) to that pixel pair (this corresponds to 0.5 bpp). Depending on the outcome of the comparison done by the comparator block 59, either the RGB565 encoded data or the RGBG8888 encoded data are forwarded via a bus 56.1 to a frame memory (not depicted in FIG. 7).

The decoding block that follows after the frame memory requires the information contained in the compression-format code in order to be able to interpret the encoded information when reading the data from the frame memory, as discussed in connection with earlier embodiments.

As described in connection with FIG. 7, an improvement of the image quality can be achieved by comparing the color compressed pixel and quantized pixel with the original pixel and selecting the one with the smallest error.

The principle described in connection with FIG. 1 and the equations (1)-(2) can also be applied to other situations where the received image data are represented by an RGB input. The color compression described above can for instance be used in connection with the transmission and/or storage of image data.

Figure 8:
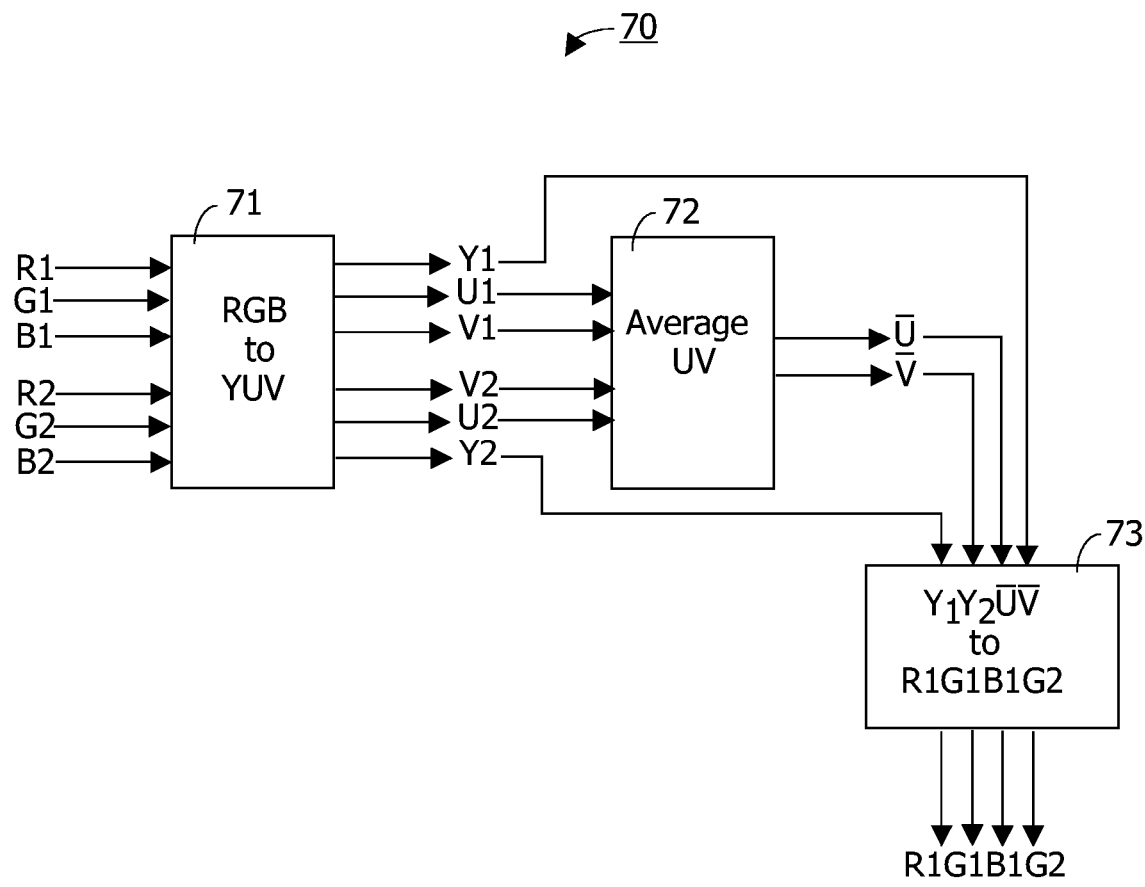
FIG. 8 shows a schematic block diagram of a sixth embodiment of the present invention.

Further details of the RGBG compression are described in connection with another specific embodiment. This embodiment is illustrated in FIG. 8. A circuit 70 is shown that comprises several building blocks to illustrate the various method steps of the RGB to RGBG compression. RGB-formatted image data $R_1G_1B_1$ and $R_2G_2B_2$ are received by an RGB to YUV 4:4:4 converter 71. The individual pixels are converted to a YUV representation that comprises $Y_1$, $U_1$ and $V_1$ components representing the first pixel $R_1G_1B_1$ and $Y_2$, $U_2$ and $V_2$ components representing the second pixel $R_2G_2B_2$. Then in a next step the YUV 4:4:4 representations of the two adjacent pixels are combined into a YUV 4:2:2 representation. This is done by averaging the individual $U_1$, $U_2$ and $V_1$, $V_2$ components of the two adjacent pixels. The individual Y components $Y_1$ and $Y_2$ of all two adjacent pixels are maintained. The averaging in the present embodiment is done by the block 72. A compressed YUV 4:2:2 representation ($Y_1Y_2UV$) is obtained and made available to another block 73. This block 73 converts the compressed YUV 4:2:2 representation to a compressed RGBG representation ($R_1G_1B_1G_2$) of the two adjacent pixels.

If two adjacent pixels are processed, as described in connection with FIG. 7, one can compress RGB-formatted image data having 24 bits per pixel into a compressed RGBG representation having 32 bits (equal to 16 bits per pixel). As an example, RGB-formatted image data having 18 bits per pixel can be compressed into a combined RGBG representation having 24 bits (equal to 12 bits per pixel). These examples show that this compression technique can save 33% of the initially required memory.

Figure 11:
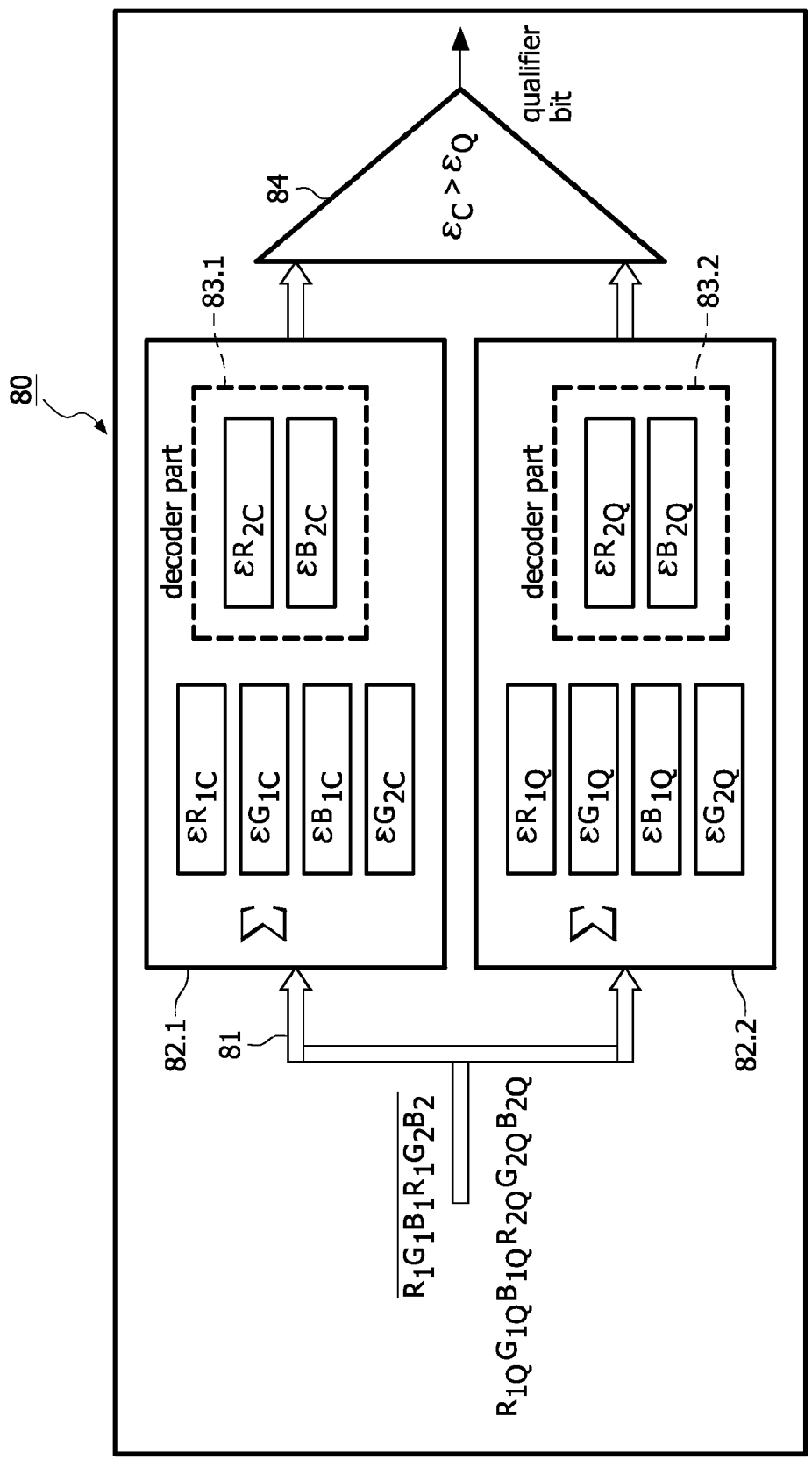
FIG. 11 shows a schematic block diagram of a seventh embodiment, according to the present invention.

Another embodiment of the invention is presented in connection with FIG. 11. Before details of this embodiment are addressed, some basic remarks regarding lossy compression and the impact of lossy compression on the image quality are addressed. If a lossy compression is employed, the original image (e.g. the image shown in FIG. 9A) is not perfectly reconstructed. In FIG. 9B the reconstructed image after lossy compression is depicted. FIG. 9B shows a situation where the compression means of FIG. 7 were employed. Despite the fact that an ad-hoc determination of errors is performed for each pixel pair (or pixel cluster), the reconstruction error is 0.95%. FIG. 9C now shows the result of a compression scheme where the perceived image quality is taken into consideration when selecting the "appropriate" compression scheme. With this compression scheme based on the perceived image quality a reconstruction error of about 0.36% can be achieved.

The block diagram of a corresponding implementation is shown in FIG. 11. In FIG. 11 a special decision logic 80 is shown that can be employed on the encoder side of the frame memory of a display driver, for instance. The decision logic 80 could be used instead of the one depicted in FIG. 7. The decision logic 80 allows to further minimize the reconstruction error, that is the reconstruction quality is increased.

Before addressing details of this decision logic 80, an overview of the data flow from the input side to the output side is summarized by FIG. 10 and recapitulated by the following mathematical representation (input=>compressed and stored=>reconstructed), respectively:

$R_1G_1B_1R_2G_2B_2 \Rightarrow \overline{R_1G_1B_1G_2}$ or $R_{1Q}G_{1Q}B_{1Q}R_{2Q}G_{2Q}B_{2Q} \Rightarrow \overline{R_1G_1B_1R_1G_2B_2}$ or $R'_1G'_1B'_1R'_2G'_2B'_2$ The decision logic 80 is connected to a bus 81 via which it receives quantized RGB image data ($R_{1Q}G_{1Q}B_{1Q}R_{2Q}G_{2Q}B_{2Q}$) and RGBG color compressed image data ($\overline{R_1G_1B_1R_1G_2B_2}$). There are two parallel decision branches 82.1 and 82.2. The upper branch 82.1 determines six different error components and the lower branch 82.2 determines six different error components.

The quantization error can be expressed by the following equations:

$\epsilon_{quantised} = \epsilon_{rgb} = |R_1 - 8R_{1Q}| + |G_1 - 4G_{1Q}| + |B_1 - 8B_{1Q}| + |R_2 - 8R_{2Q}| + |G_2 - 8G_{2Q}| + |B_2 - 8B_{2Q}|$ $\epsilon_{quantised} = \epsilon_{R_{1Q}} + \epsilon_{G_{1Q}} + \epsilon_{B_{1Q}} + \epsilon_{R_{2Q}} + \epsilon_{G_{2Q}} + \epsilon_{B_{2Q}}$ And the RGBG color compression error can be expressed by the following equations:

$\epsilon_{colorcompressed} = \epsilon_{rgbg} = |R_1 - \overline{R_{1c}}| + |G_1 - \overline{G_{1c}}| + |B_1 - \overline{B_{1c}}| + |R_2 - \overline{R^*_{2c}}| + |G_2 - \overline{G_{2c}}| + |B_2 - \overline{B^*_{2c}}|$ $\epsilon_{colorcompressed} = \epsilon_{R_{1C}} + \epsilon_{G_{1C}} + \epsilon_{B_{1C}} + \epsilon_{R^*_{2C}} + \epsilon_{G_{2C}} + \epsilon_{B^*_{2C}}$ The present embodiment of the decision logic 80 takes into consideration the reconstruction error that will eventually occur when fetching image data from the frame memory and when decoding these image data. In other words, this embodiment considers the perceived reconstruction error when making the decision at the input side of the frame memory. For this purpose the decision logic 80 comprises a replication of certain elements that are also present in the decode at the output side of the frame memory. These elements are represented by the reference numbers 83.1 and 83.2 in FIG. 11. The decision logic 80 is a bit more complex than the decision logic 67.1, for instance, since the logic 80 determines six different error components rather than four (cf. equations (3) and (4)).

The values $\overline{R_2}$ and $\overline{B_2}$ are not stored in the frame memory due to the compression performed. The encoder (respectively, the decision logic 80 of the encode) and the decoder both independently calculate the approximated values $\overline{R_2}$ and $\overline{B_2}$ replaced by their reconstructed values $\overline{R^*_2}$ and $\overline{B^*_2}$. ($\overline{R_2} \cong \overline{R^*_2}$; $\overline{B_2} \cong \overline{B^*_2}$). This is possible since the values $\overline{R_1}$, $\overline{G_1}$, $\overline{B_1}$, $\overline{G_2}$ are known. The below equations are used to calculate the values $\overline{R_2}$ and $\overline{B_2}$.

$$\begin{bmatrix} \overline{R_1} \\ \overline{G_1} \\ \overline{B_1} \\ \overline{R_2} \\ \overline{G_2} \\ \overline{B_2} \end{bmatrix} = \begin{bmatrix} 1 & 0 & 0 & 0 \\ 0 & 1 & 0 & 0 \\ 0 & 0 & 1 & 0 \\ 1 & -1 & 0 & 1 \\ 0 & 0 & 0 & 1 \\ 0 & -1 & 1 & 1 \end{bmatrix} \cdot \begin{bmatrix} \overline{R_1} \\ \overline{G_1} \\ \overline{B_1} \\ \overline{G_2} \end{bmatrix}$$

Note that this formula was already given before as *eq.* (2)

$$\overline{R_2} = \overline{R_1} - \overline{G_1} + \overline{G_2}$$

$$\overline{B_2} = \overline{B_1} - \overline{G_1} + \overline{G_2}$$

Note that this formula was already given before as eq. (2)

Like in FIG. 7, a comparator block 84 is employed that evaluates the results by comparing the errors as $$\text{if}(\epsilon_{colorcompressed} > \epsilon_{quantised})$$

follows: then(select ⇒ RGB565format)

else(select ⇒ RGBGformat)

This equation is the same as equation (5). It shows that the compression type is selected adaptively based on the perceived pixel quality.

It is an advantage of the adaptive color compression technique according to the present invention that, when performing the compression of the RGB-formatted image data into the compressed RGBG representation, there is no loss of code space since code compression is performed on the data in the YUV domain and said data is converted back again to the RGB space before storing it into memory. It is another advantage that storage in the RGBG representation shows a better signal-to-noise ratio than a conventional YUV representation of the same RGB-formatted image data, and hence achieves a better image quality. Two bits per component are saved because YYUV requires 40 bits while RGBG only requires 32 bits to represent the same information.

If one chooses matrix operations with simplified coefficients (cf. matrices (1) and (2)) defining the compression, the whole compression scheme can be easily implemented in hardware. The conversion from RGB to YUV and back to RGB again is completely done inside the display driver. The encoding and decoding matrices have to match meaning that the decoder matrix is the inverse of the encoding matrix.

If one uses the novel and inventive RGBG approach described above, using RGB666 input, the resulting RGBG6666 output can potentially show $2^{18} = 260$ k colors while a YYUV output would only show 90 k colors due to the loss of codes.

The averaging of the UV components of two adjacent pixels, as described herein (see FIG. 3B, for instance), only leads to good results when the colors are about the same (which is true for natural scenes).

Taking all these observations and findings into consideration, the invention offers smart compression schemes that not only maintain, or at least take into consideration, the perceived quality of the color image, but also guarantee a certain compression ratio. This is necessary if one wants to compress the image data representing a color image before storing them in the frame buffer of a display driver. Only if a certain compression ratio can be guaranteed, no matter what the nature of the image is, can the storage area of the frame buffer be reduced. But, as mentioned above, the RGBG compression scheme presented herein can also be used in other applications that handle or process image data.

The smart compression scheme, according to the present invention, makes use of the redundancy present in YUV processed pixels in order to avoid the loss of code space, described above. When this redundancy is removed, the compression ratio can be fully exploited.

According to the present invention, the conversion from RGB to YUV and the conversion from YUV back to RGB is done internally in the display driver. This is possible since fewer operations are required than hitherto if one employs the inventive compression scheme.

In a preferred embodiment, hardware optimized coefficients can be employed for the matrices. This is possible as long as the matrices are the inverse of each other in a reasonable way.

According to one specific embodiment of the present invention (FIG. 7), the conversion from RGB to YUV and back is done completely in front of the frame memory. The compressed RGB pixels from this operation are compared with the original image data. Based on this comparison the display driver can decide whether to encode a pixel pair as RGBG or as two quantized RGB pixels.

Another embodiment is able to support multiple input formats, such as RGB888 and YUV4:2:2. In this case different input matrices have to be employed that pack the input pixels as RGBG format in the frame memory.

$$YYUV \text{ to } RGBG \text{ encoding matrix} \begin{bmatrix} \overline{R_1} \\ \overline{G_1} \\ \overline{B_1} \\ \overline{G_2} \end{bmatrix} =$$

$$\begin{bmatrix} 1.000 & 0.000 & 0.000 & 1.402 \\ 1.000 & 0.000 & -0.344 & -0.714 \\ 1.000 & 0.000 & 1.772 & 0.000 \\ 0.000 & 1.000 & -0.344 & -0.714 \end{bmatrix} \cdot \begin{bmatrix} Y_1 \\ Y_2 \\ U \\ V \end{bmatrix}$$

The matrix employed for decompression after the frame memory will not be affected by this.

It is another advantage of the compression according to the present invention that it allows a smaller frame memory to be employed in a display driver without sacrificing too much of the perceived image quality. The present invention is thus very well suited for use in mobile display drivers where a complete copy of the image data is stored in a frame memory.

It is a further advantage that the compression schemes presented herein are easy to implement and that the additional costs are relatively low.

The present invention can be used in a display driver wherein several image data must be decompressed per second, and wherein preferably image data are fetched from the memory and decompressed about 50 times per second.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable sub-combination.

In the drawings and specification, there have been set forth preferred embodiments of the invention and, although specific terms are used, the description thus given uses terminology in a generic and descriptive sense only and not for purposes of limitation.

The invention claimed is:

1. A display driver with a frame memory for temporarily storing image data representing a color image, and a data bus for feeding image data to said display driver, characterized in that said display driver comprises: means for performing a decision process, said decision process being based on an analysis of the color characteristics of a pixel cluster of said image data, the means for performing a decision process allowing the display driver to decide whether a first compression format or a second compression format is to be applied for compression of said pixel cluster, first compression means performing a compression of said pixel cluster into said first compression format, second compression means performing a compression of said pixel cluster into said second format, wherein said first compression format or said second compression format is selected based upon said results of said decision process, the pixel clusters are stored after compression in an available storage area of said frame memory, and a compression-format code is stored indicating which compression format was used for which pixel cluster.

2. The display driver as claimed in claim 1, comprising: first decompression means performing a decompression into a cluster of RGB format based pixels of those pixel clusters that were compressed using said first compression format, second decompression means performing a decompression into a cluster of RGB format based pixels of those pixel clusters that were compressed using said second compression format, wherein said first decompression means and second decompression means take into consideration said compression-format code.

3. The display driver as claimed in claim 2, comprising means for performing a decision process, said decision process being based on said compression-format code related pixel cluster of said image data, said pixel cluster representing part of said color image, the means for performing a decision process allowing the display driver to decide whether a first decompression format or a second decompression format is to be applied for decompression of said pixel cluster.

4. The display driver as claimed in claim 1, wherein at least part of said image data is stored in said storage area in the first compression format and another part of said image date is stored in said storage area in the second compression format.

5. The display driver as claimed in claim 1, wherein said data bus is feeding YUV 4:2:2-formatted image data to said display driver, characterized in that said display driver converts this input always into the second compression format.

6. The display driver as claimed in claim 1, wherein said analysis of the color characteristics of a pixel cluster is compared with a predefined threshold, and wherein said means for performing a decision process provide an output reflecting which compression format is to be applied for compression of said pixel cluster.

7. The display driver as claimed in claim 1, wherein said decision process is based upon an analysis of the color error due to a first compression format of a pixel cluster of said image data, and the color error due to an alternative compression format of the same pixel cluster of said image data, said pixel cluster representing part of said color image, and wherein said means for performing a decision process provide an output reflecting which compression format is to be applied for compression of said pixel cluster.

8. The display driver as claimed in claim 7, wherein said decision process is based upon an analysis of the perceived compression quality.

9. The display driver as claimed in claim 1, wherein said first compression format is an RGB format or an RGB-based format and said second compression format is a color compressed YUV format or a color compressed YUV-based format.

10. The display driver as claimed in claim 1, wherein said first compression format is an RGB format or an RGB-based format and said second compression format is a color compressed RGBG format or a color compressed RGBG-based format like e.g. RGBR, RGBB or RGBY.

11. The display driver as claimed in claim 1, wherein said first compression format is an RGB format or an RGB-based format and more than one alternative color compressed format is supported, including the related decision process and compression-and decompression format codes.

12. The display driver as claimed in claim 1, wherein the second compression format applied by the second compression means collects a pixel cluster of n adjacent pixels, with n>2, converts them to a YUV format, averages the U and V components, and calculates resulting RGBG, RGBGG through RGB n*G pixels, wherein said pixel cluster may span more than one line of image data.

13. The display driver as claimed in claim 1, wherein said RGB-formatted image data have n bits per pixel, said input bus is n bit wide and the storage area of said frame memory is defined for storing image data with ⅔ *n bits per pixel, and image data retrieved from said frame memory have n bits per pixel, maintaining a proper image quality.

14. The display driver as claimed in claim 1, wherein said decompression means are at their output side associated with column drivers of said display driver.

15. The display driver as claimed in claim 1, wherein several image data must be decompressed per second, and wherein preferably image data are decompressed about 50 times per second.

16. The display driver as claimed in claim 1, wherein the frame memory is an embedded frame memory.

17. A method for color compression and decompression of RGB-formatted image data comprising the following steps:
 a. collecting n adjacent pixels using i bits per pixel, with $n \geq 2$,
 b. individually converting each of the n adjacent pixels to a YUV 4:4:4 representation that comprises Y, U and V components representing the respective pixel using j bpp, with typically $j = i+6$,
 c. combining the YUV representations of the n adjacent pixels by averaging the individual U and V components of all n adjacent pixels and by maintaining the individual Y components of all n adjacent pixels in order to obtain a color compressed YUV representation $(Y_I \ldots Y_n UV)$ using k bpp, with typically $k = j(2+n)/3n = (i+6)*(2+n)/3n$, and
 d. coding the color compressed YUV representation to a color compressed $RG_IBG \ldots G_n$ representation of the n adjacent pixels using l bpp, with typically $I = k-6 = i(2+n)/3n$.

18. The method as claimed in claim 17, comprising the following step:
   decoding the color compressed $RG_IBG \ldots G_n$ representation of the n adjacent pixels into n adjacent pixels in an RGB representation using m bpp, with typically m =3 nl/(2+n)=i.

19. The method as claimed in claim 17, characterized in that there is no loss of code space when performing the compression of the color compressed YUV 4:2:2 representation into a color compressed RGBG, RGBR, RGBB or RGBY representation, since the compression is only removing redundant data, hence said color compressed RGBG, RGBR, RGBB and RGBY representation shows a better signal-to-noise ratio than a conventional YUV 4:2:2 representation of the same RGB-formatted image data using the same number of bpp.

20. The method as claimed in claim 17, characterized in that the encoding steps of converting RGB representation to YUV 4:4:4 representation, color compression of YUV 4:4:4 representation to YUV 4:2:2 representation and code compression of YUV 4:2:2 representation into RGBG, RGBR, RGBB or RGBY representation is performed by only one single matrix operation, and the decoding steps of converting said color compressed RGBG, RGBR, RGBB or RGBY representation back into RGB representation is also performed by one single matrix operation.

21. A method for temporarily storing image data representing a color image, characterized in that said image data is stored in a compressed format, a. an RGB-formatted image data stream drives a decision process, comparing the color characteristics of a pixel cluster of said image data with a predefined threshold; its result defines the compression format code and decides whether a first compression format or a second compression format is to be applied for compression of said pixel cluster, b. said compression-format code and said pixel cluster, after compression, are stored in an available storage area, c. said pixel cluster and compression-format code are retrieved from said storage and decoded.

22. The method as claimed in claim 21, wherein the value of the compression-format code determines whether said pixel cluster is decompressed from quantized RGB format into a cluster of RGB format based pixels, or from color compressed format into a cluster of RGB format based pixels.

23. The method as claimed in claim 21, wherein said decision process is based upon an analysis of the color error due to a first compression format of said pixel cluster of said image data, and the color error due to an alternative compression format of the same pixel cluster.

24. The method as claimed in claim 23, wherein said decision process is based upon an analysis of the perceived compression quality.

25. The method as claimed in claim 21, wherein said color compressed format is a YUV 4:2:2 format.

26. The method as claimed in claim 21, wherein said color compressed format is a color compressed RGBG, RGBR, RGBB or RGBY format.

27. The method as claimed in claim 21 being implemented in the front end of a display driver.

28. The method as claimed in claim 1 being implemented in the video graphics adapter of a personal computer.

* * * * *